US009816855B2

(12) United States Patent
Hollingsworth

(10) Patent No.: US 9,816,855 B2
(45) Date of Patent: Nov. 14, 2017

(54) SYSTEM FOR MEASURING LIGHT INTENSITY AND WIRELESSLY TRANSFERRING LIGHT INTENSITY DATA

(71) Applicant: Dawn Hollingsworth, Sherman Oaks, CA (US)

(72) Inventor: Dawn Hollingsworth, Sherman Oaks, CA (US)

( * ) Notice: Subject to any disclaimer, the term of this patent is extended or adjusted under 35 U.S.C. 154(b) by 233 days.

(21) Appl. No.: 14/681,563

(22) Filed: Apr. 8, 2015

(65) Prior Publication Data
US 2015/0211921 A1 Jul. 30, 2015

Related U.S. Application Data

(63) Continuation-in-part of application No. 13/986,085, filed on Mar. 30, 2013, now abandoned.

(51) Int. Cl.
*G01J 1/02* (2006.01)
*G01J 1/04* (2006.01)

(52) U.S. Cl.
CPC ........... *G01J 1/0219* (2013.01); *G01J 1/0233* (2013.01); *G01J 1/0247* (2013.01); *G01J 1/0271* (2013.01); *G01J 1/0411* (2013.01); *G01J 2001/0257* (2013.01)

(58) Field of Classification Search
CPC ...... G01J 1/0219; G01J 1/0233; G01J 1/0247; G01J 1/0271; G01J 1/0411; G01J 2001/0257
See application file for complete search history.

(56) References Cited

U.S. PATENT DOCUMENTS

| | | | | |
|---|---|---|---|---|
| 5,986,576 A * | 11/1999 | Armstrong | ............. | F21V 21/06 116/63 P |
| 7,040,773 B1 * | 5/2006 | Zincone | ................. | G08G 1/095 126/600 |
| 8,819,313 B1 * | 8/2014 | Walther | ................. | G08G 1/097 709/208 |
| 2004/0178928 A1 * | 9/2004 | Butzer | ................... | G08G 1/095 340/908 |
| 2008/0198038 A1 * | 8/2008 | Yingst | ................. | G08G 1/0955 340/908 |
| 2009/0192348 A1 * | 7/2009 | Nishino | ............. | A61B 1/00009 600/103 |
| 2010/0157095 A1 * | 6/2010 | Karn | ................... | G11B 27/034 348/231.1 |
| 2012/0037793 A1 * | 2/2012 | Ong | ........................ | G02B 3/02 250/216 |

* cited by examiner

*Primary Examiner* — Francis M Legasse, Jr.

(57) ABSTRACT

A system for measuring light intensity of a specific location and wirelessly transferring the light intensity data contains at least one light intensity sensing assembly and a computing device. The light intensity data is recorded by the light intensity sensing assembly and is wirelessly transferred to the computing device. The light intensity sensing assembly contains a dome lens, a photocell, a processing unit, a wireless data-transferring module, and a portable power source. The photocell is centrally mounted within the dome lens in order to receive a maximum amount of light. The photocell is electronically connected to the processing unit. In order to transmit the light intensity data, the processing unit is electronically connected to the wireless data transfer module. The photocell, the processing unit, and the wireless data-transferring module are powered by the portable power source.

5 Claims, 5 Drawing Sheets

SYSTEM FOR MEASURING LIGHT INTENSITY AND WIRELESSLY TRANSFERRING LIGHT INTENSITY DATA The current application is a continuation-in-part and claims priority to a non-provisional application Ser. No. 13/986,085 filed on Mar. 30, 2013.

FIELD OF THE INVENTION

The present invention relates generally to light intensity sensors. More specifically, the present invention is an apparatus that can record light intensity data at a specific location and wirelessly transfer the light intensity data.

BACKGROUND OF THE INVENTION

Light intensity sensors are utilized to measure the intensity of light at a specific location. Art galleries, greenhouses, and museums are some of the locations that commonly utilize light intensity sensors. However, the available light intensity sensors have a series of drawbacks that need to be addressed.

A major disadvantage of the existing light intensity sensors is the limited range they can be used in. More specifically, most light intensity sensors are designed such that the light intensity sensor and the light intensity reading display are connected to each other through a cable. Therefore, the range in which the light intensity sensor can be used in is restricted to the length of the cable. This is especially disadvantageous when measuring light intensity levels at a height. If a user intends on using one of the existing light meters at a considerable height, a ladder or similar elevation is essential. The use of elevated platforms can be dangerous and time consuming. As an example, if the user intends on obtaining a light intensity reading at a crowded location, having to use a ladder or similar elevation can be disturbing to the public. Therefore, it is clear that the limited range of the existing light intensity sensors is an issue that requires immediate attention.

Most mobile devices available in the market today are equipped with a camera that can also be used as a light intensity sensor. These mobile devices calculate the light intensity according to the light received by the camera lens. Since the camera lens of the mobile device is designed for photography, the camera captures only a limited amount of light. Therefore, the light intensity reading can vary from the actual light intensity. Another disadvantage of using a mobile phone as a light intensity sensor is the need to hold the mobile device when obtaining a reading. Since the user is in close proximity to the mobile device or other comparable device, a high probability exists for the shadow of the user to fall upon the camera lens. Therefore, the reading may vary from the actual light intensity.

Another significant disadvantage with the existing light intensity sensors is the inability to control data. More specifically, with the existing light intensity sensors a light intensity reading can be obtained, but cannot be saved or transmitted. The inability to save or transfer data is disadvantageous in fields that have strict light intensity requirements.

The objective of the present invention is to address the aforementioned issues. In particular, the present invention introduces an apparatus that is able to transmit data wirelessly to a mobile device. As a result, the present invention resolves the issues of having a limited range and also getting inaccurate results due to the shadow of the user. The effective design of the present invention allows the photocell to receive a maximum amount of light in order to output the most accurate light intensity reading. Therefore, by utilizing the present invention, user safety and accurate light intensity readings are guaranteed.

DETAIL DESCRIPTIONS OF THE INVENTION

All illustrations of the drawings are for the purpose of describing selected versions of the present invention and are not intended to limit the scope of the present invention.

The present invention is an apparatus that can read the light intensity at a specific location, and wirelessly transfer the light intensity data to a computing device. The present invention allows the user to get light intensity data from locations that would have been impractical with existing light intensity data readers.

Figure 1:
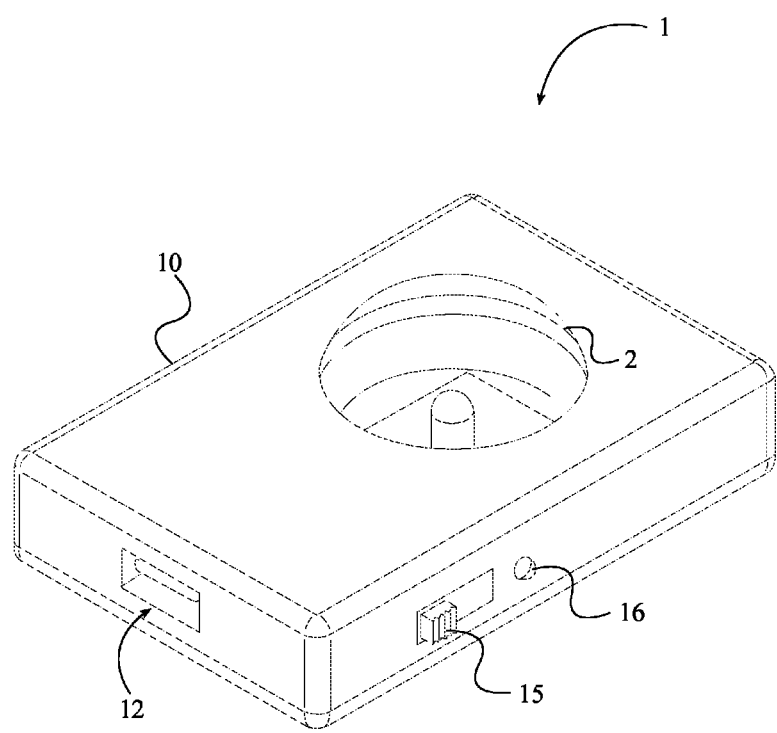
FIG. 1 is a perspective view of a light intensity sensing assembly.
Figure 2:
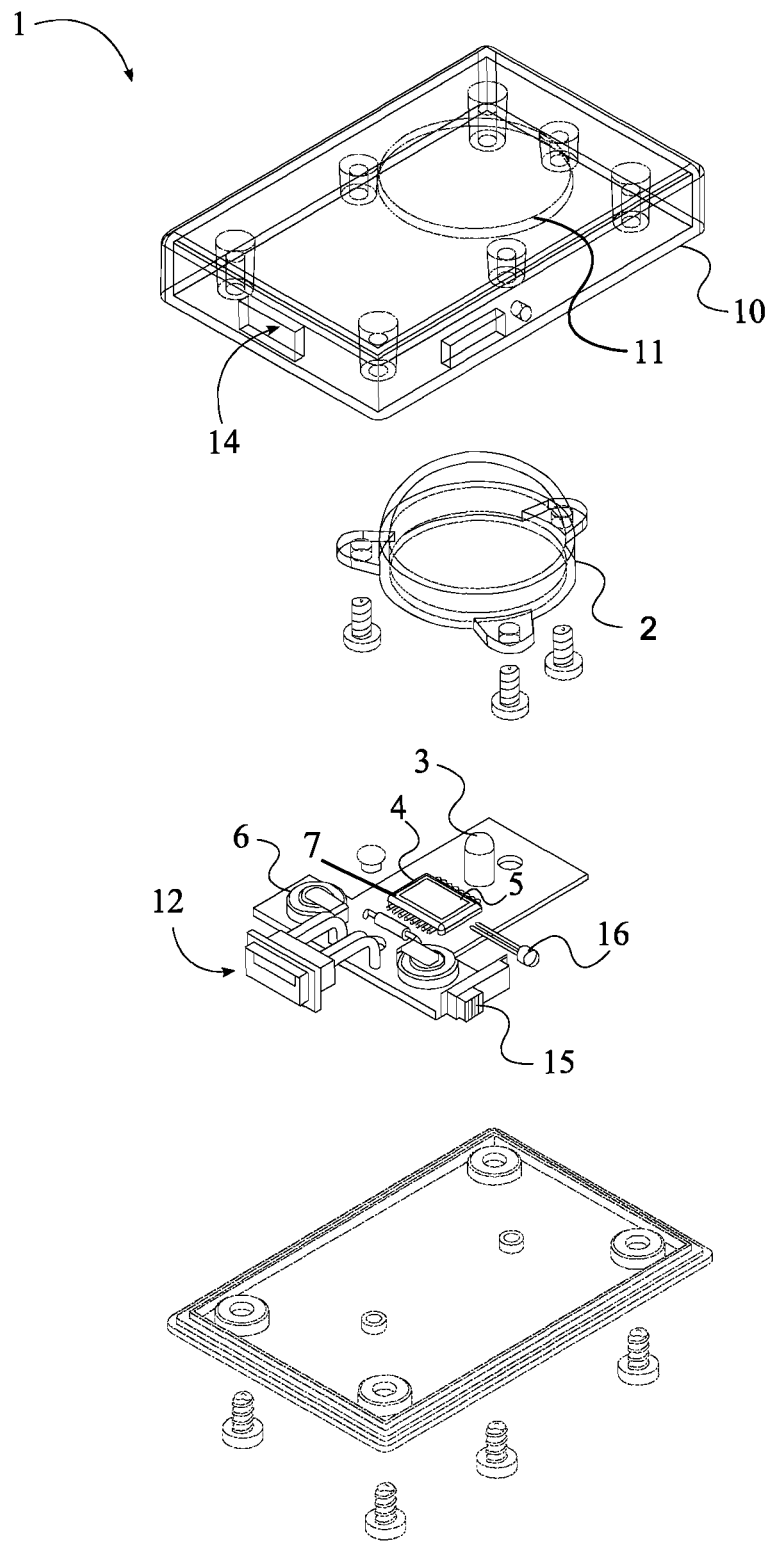
FIG. 2 is an exploded view of the light intensity sensing assembly.
Figure 3:
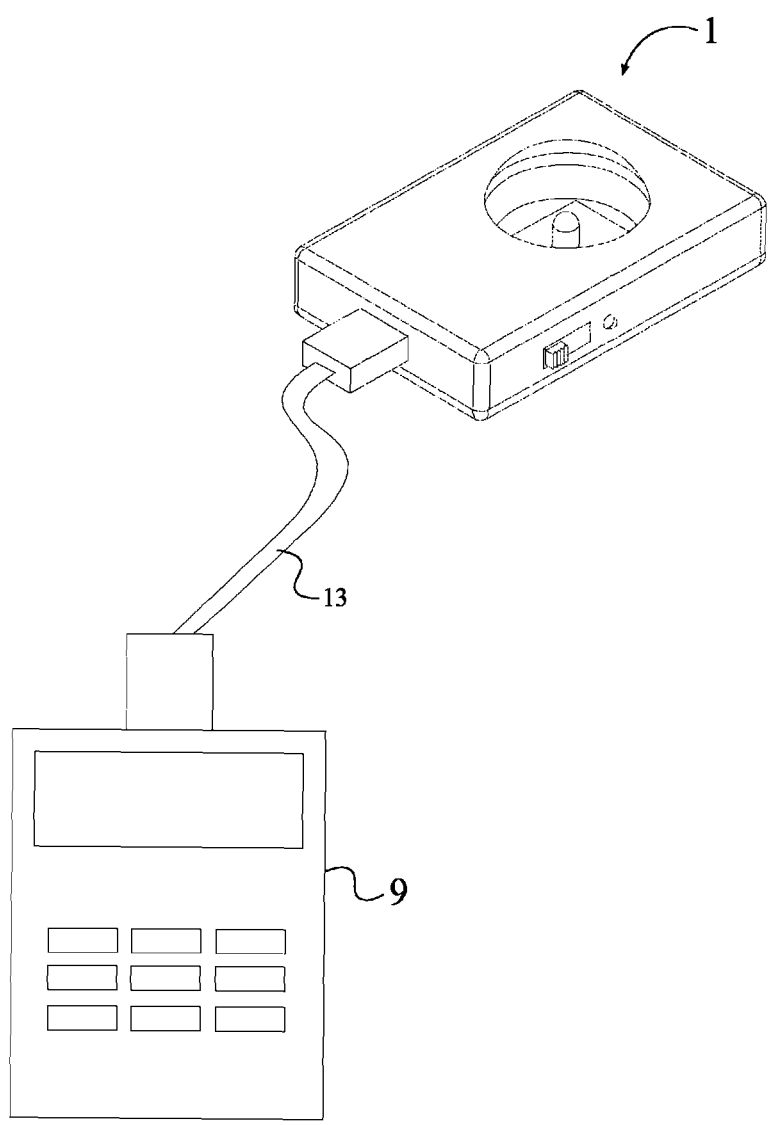
FIG. 3 is an illustration of the light intensity sensing assembly and a computing device being connected to each other through a hardwire connection port.

As seen in FIGS. 1-3, the present invention comprises an at least one light intensity sensing assembly 1 and a computing device 9. The light intensity sensing assembly 1 is positioned at the location in which a light intensity reading is required. When the light intensity sensing assembly 1 reads the light intensity of the location, all data related to the light intensity is wirelessly transferred to the computing device 9. The user utilizes the computing device 9 to manipulate the light intensity data received from the light intensity sensing assembly 1. The light intensity sensing assembly 1 comprises a dome lens 2, a photocell 3, a processing unit 4, a wireless data-transferring module 5, and a portable power source 6. The process of reading light intensity is initiated by the photocell 3. More specifically, the photocell 3 detects the light intensity at the location the present invention is used in, and converts the data into an electric signal. The dome lens 2 is a 360-degree spherical dome, which helps capture a majority of the light in the vicinity of the present invention. The light captured by the dome lens 2 is then directed towards the photocell 3. The photocell 3 is centrally mounted within the dome lens 2 in order to receive light from all angles of the dome lens 2. The photocell 3 is electronically connected to the processing unit 4. The processing unit 4 accumulates data received from the photocell 3, prior to transferring the data to the computing device 9. Since the preferred embodiment of the present invention transfers the instantaneous light intensity data wirelessly, the processing unit 4 is electronically connected to the wireless data-transferring module 5. The portable power source 6 supplies power to the photocell 3, the processing unit 4, and the wireless data-transferring module 5. In order to do so, the portable power source 6 is electrically connected to the photocell 3, the processing unit 4, and the wireless data-transferring module 5. In the preferred embodiment of the present invention, a 9-volt battery is utilized as the portable power source 6. However, in other embodiments of the present invention, a different power source can be utilized as the portable power source 6. The wireless data-transferring module 5 wirelessly transfers the captured light intensity data by being communicably coupled to the computing device 9; wherein the light intensity sensing assembly 1 is communicably coupled to the computing device 9 through the wireless data-transferring module 5. The wireless transfer method utilized in the present invention determines the operational range the present invention can be used in.

As seen in FIG. 1 and FIG. 2, the present invention comprises a housing 10 which encloses the light intensity sensing assembly 1. More specifically, the photocell 3, the processing unit 4, the wireless data-transferring module 5, and the portable power source 6 are positioned within the housing 10. The housing 10 is especially important to protect the internal components of the light intensity sensing assembly 1, if the present invention is utilized outdoors. The housing 10 can be made of, but is not limited to, a lightweight material such as plastic, which is essential for user convenience. The present invention further comprises a dome opening 11 which traverses into the housing 10. The dome opening 11 is exploited to position the dome lens 2. In particular, the dome lens 2 is adjacently mounted to the housing 10 through the dome opening 11. In the preferred embodiment of the present invention, the dome opening 11 is circular in shape in order to receive the dome lens 2 which is a 360-degree spherical dome.

As discussed earlier, the light intensity sensing assembly 1 transfers light intensity data to the computing device 9 wirelessly. However, as illustrated in FIG. 3, a hardwire connection port 12 of the present invention allows the user to receive the light intensity data by hard wiring the computing device 9 into the light intensity sensing assembly 1. More specifically, the hardwire connection port 12 is electronically connected to the processing unit 4. The hardwire connection port 12 can be, but is not limited to, a universal serial bus (USB) port. As seen in FIG. 1 and FIG. 2, the hardwire connection port 12 is mounted into the housing 10 through a port opening 14 which traverses into the housing 10.

The present invention further comprises a switch 15 and an indicator light 16. The user utilizes the switch 15 to control the power flow from the portable power source 6. Therefore, the switch 15 is electrically connected to the portable power source 6. The indicator light 16 is utilized to indicate different operational modes of the present invention. For instance, the indicator light 16 can be configured to illuminate in different colors to represent different power levels of the portable power source 6. In order to do so, the indicator light 16 is also electrically connected to the portable power source 6. For user convenience, both the switch 15 and the indicator light 16 are externally mounted into the housing 10.

The wireless connection between the light intensity sensing assembly 1 and the computing device 9 also allows the light intensity sensing assembly 1 being a plurality of light intensity sensing assemblies to be connected to the computing device 9 simultaneously. The ability to connect to the plurality of light intensity sensing assemblies is especially beneficial when utilizing the present invention in a large area. In particular, the user can establish a connection to the plurality of light intensity sensing assemblies from a central location. In doing so, each of the plurality of light intensity sensing assemblies is communicably coupled to the computing device 9 through the wireless data-transferring module 5 for each of the plurality of light intensity sensing assemblies. As a result, the user can read the light intensity data of a preferred light intensity sensing assembly from the plurality of light intensity sensing assemblies.

The present invention further allows the user to record location information along with the light intensity data. In order to do so, the light intensity sensing assembly 1 comprises a geo-locator microchip 7. The geo-locator microchip 7 is electronically connected to the processing unit 4 such that the light intensity data and the location information are simultaneously recorded and transferred onto the wireless data-transferring module 5. As previously mentioned, the wireless data-transferring module 5 transmits the light intensity data along with the location information to the computing device 9 wirelessly. In another instance, when the computing device 9 is hard wired to the light intensity sensing assembly 1 through the hardwire connection port 12, the processing unit 4 transfers the light intensity data and the location information to the computing device 9 through a USB cable 13 or similar means.

Figure 4A:
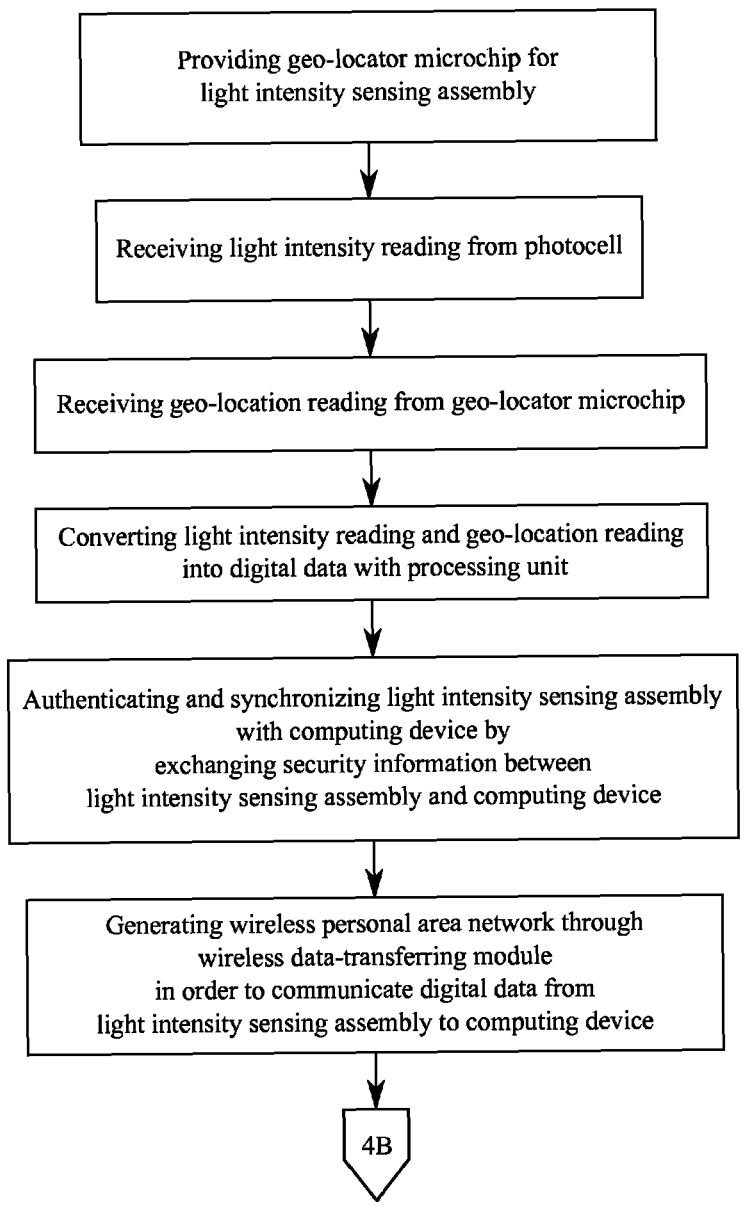
FIG. 4A is a flowchart illustrating the basic overall method of the present invention.
Figure 4B:
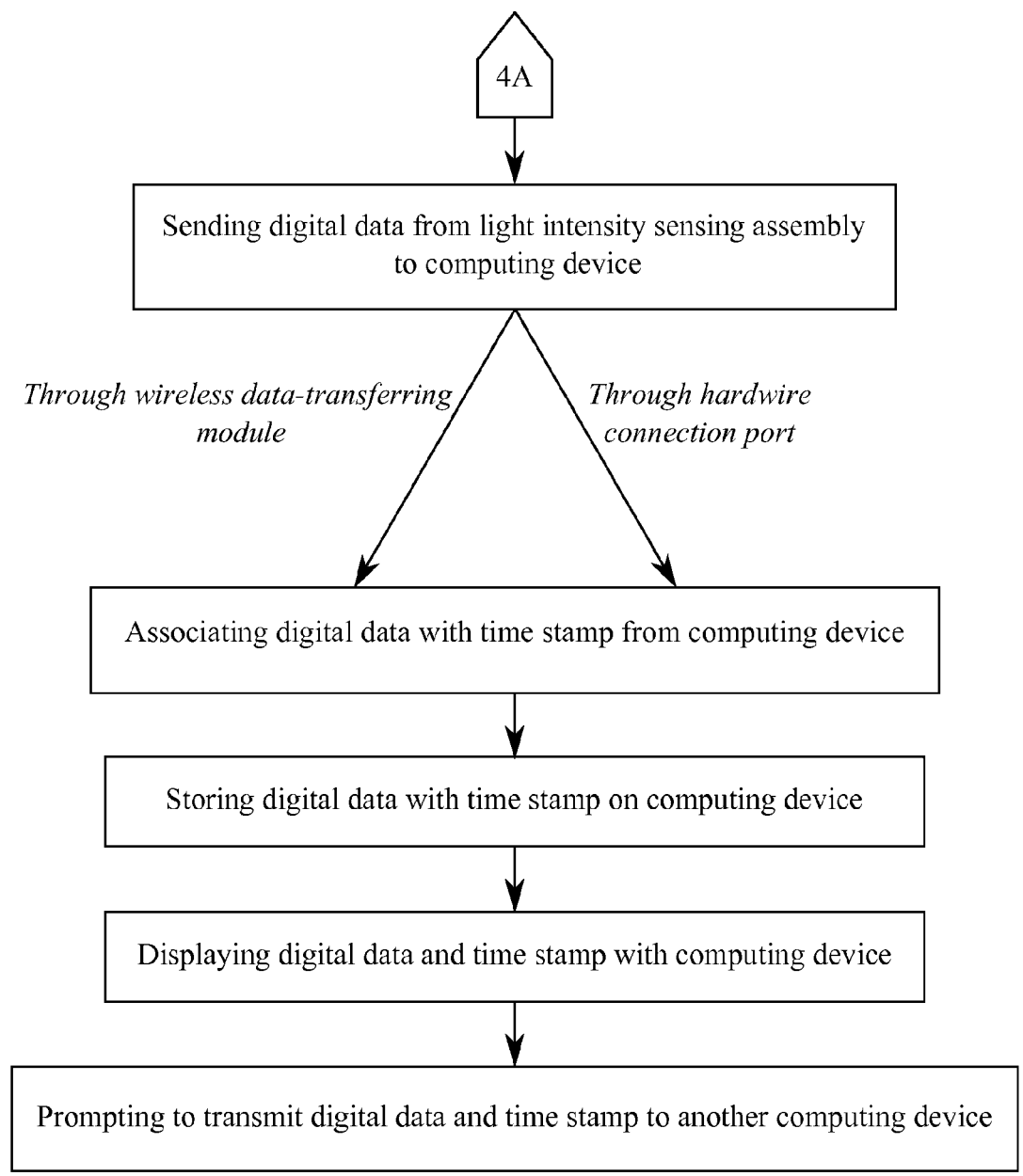
FIG. 4B is a flowchart thereof, further illustrating the basic overall method of the present invention.

As illustrated in FIG. 4A and FIG. 4B, in a typical cycle of recording light intensity data, a light intensity reading is initially received from the photocell 3. Simultaneously, a geo-location reading is received from the geo-locator microchip 7. In order to transmit the light intensity reading and the geo-location reading to the computing device 9, the light intensity reading and the geo-location reading are converted into digital data with the processing unit 4. Subsequently, the digital data from the light intensity sensing assembly 1 is sent to the computing device 9. In the preferred embodiment of the present invention, the digital data is wirelessly sent to the computing device 9 through the wireless data-transferring module 5. However, the digital data can also be sent to the computing device 9 through a USB cable 13 or a similar cable that can be connected through the hardwire connection port 12. When the computing device 9 receives the digital data, the digital data is associated with a time stamp from the computing device 9. Next the digital data is stored on the computing device 9 along with the time stamp. The time stamp is beneficial when referring back to the digital data which was previously stored and also for future analytical purposes. Consequently, the digital data and the time stamp are displayed on the computing device 9. If the user intends on sharing the digital data and the time stamp, the user can do so when the present invention prompts the user to transmit the digital data and the time stamp to another computing device 9. The computing device 9 can be, but is not limited to, a mobile phone, tablet or other comparable device.

For security purposes, the present invention authenticates and synchronizes the light intensity sensing assembly 1 with the computing device 9 by exchanging security information between the light intensity sensing assembly 1 and the computing device 9. As a result, the user can connect to only the preferred light intensity sensing assembly. When the present invention completes the authentication and synchronization process, a wireless personal area network is generated between the light intensity sensing assembly 1 and the computing device 9 in order to communicate the digital data. More specifically, the wireless personal area network creates a secure communication path to transfer digital data from the light intensity sensing assembly 1 to the computing device 9.

Although the invention has been explained in relation to its preferred embodiment, it is to be understood that many other possible modifications and variations can be made without departing from the spirit and scope of the invention as hereinafter claimed.

What is claimed is:

1. A system for measuring light intensity comprising:
a computing device;
a light intensity sensing assembly;
the computing device and the light intensity sensing assembly being communicably coupled to each other;
the light intensity sensing assembly comprising a housing, a cable, a hardwire connection port, a switch, an indicator light, a dome lens, a photocell, a processing unit, a wireless data-transferring module, a geo-locator microchip and a portable power source;
the housing comprising a port opening, a switch opening, an indicator opening and a dome opening;
the hardwire connection port traversing through the port opening;
the switch traversing through the switch opening;
the indicator light traversing through the indicator opening;
the dome lens traversing through the dome opening;
the dome opening being circular in shape;
the dome lens being spherical in shape;
the cable being configured to be connected with the hardwire connection port and the light intensity sensing assembly;
the cable being positioned outside the housing in response to the cable being connected with the hardwire connection port;
the photocell, the processing unit, the wireless data-transferring module, the geo-locator microchip and the portable power source being accommodated within the housing;
the photocell being centrally accommodated within the dome lens;
the cable being electronically connected to the hardwire connection port in response to the cable being connected with the hardwire connection port;
the hardwire connection port, the switch, the indicator light, the photocell, the processing unit, the wireless data-transferring module, the geo-locator microchip and the portable power source being electronically connected to one another;
the switch being configured to control a power flow from the portable power source;
the indicator light being configured to illuminate in a plurality of colors;
the plurality of colors being configured to represent a plurality of power levels of the portable power source; and
the computing device and the light intensity sensing assembly being communicably coupled to each other selectively through the cable and the wireless data-transferring module.

2. A method of measuring light intensity by using the system of claim 1, the method comprising:
receiving a light intensity reading from the photocell;
receiving a geo-location reading from the geo-locator microchip;
converting the light intensity reading and the geo-location reading into a digital data by the processing unit;
sending the digital data from the light intensity sensing assembly to the computing device;
associating the digital data with a time stamp from the computing device;
storing the digital data with the time stamp on the computing device;
displaying the digital data and the time stamp by the computing device; and
prompting to transmit the digital data and the time stamp to another computing device.

3. The method of claim 2 comprising:
sending the digital data from the light intensity sensing assembly to the computing device through the wireless data-transferring module.

4. The method of claim 2 comprising:
the light intensity sensing assembly sends sending the digital data from the light intensity sensing assembly to the computing device through the cable.

5. The method of claim 3 comprising:
authenticating and synchronizing the light intensity sensing assembly with the computing device by exchanging security information between the light intensity sensing assembly and the computing device; and
generating a wireless personal area network through the wireless data-transferring module in order to communicate the digital data from the light intensity sensing assembly to the computing device.

* * * * *